United States Patent [19]

Fish

[11] 3,871,930

[45] Mar. 18, 1975

[54] METHOD OF ETCHING FILMS MADE OF POLYIMIDE BASED POLYMERS

[75] Inventor: John G. Fish, Richardson, Tex.

[73] Assignee: Texas Instruments Incorporated, Dallas, Tex.

[22] Filed: Dec. 19, 1973

[21] Appl. No.: 426,275

[52] U.S. Cl. .......................... 156/3, 96/36.2, 156/8, 252/79.5

[51] Int. Cl. .......................... H05k 3/06

[58] Field of Search ....... 96/36.2; 174/68.5; 29/625; 156/2, 3, 8; 252/79.5

[56] References Cited

UNITED STATES PATENTS

| | | | |
|---|---|---|---|
| 3,736,170 | 5/1973 | Endwell et al. | 117/47 A |
| 3,767,490 | 10/1973 | Alberts | 156/2 |
| 3,770,528 | 11/1973 | Hermes | 156/2 |
| 3,791,848 | 2/1974 | DeAngelo | 117/47 A |

*Primary Examiner*—William A. Powell
*Attorney, Agent, or Firm*—Harold Levine; James T. Comfort; William E. Hiller

[57] ABSTRACT

Methods for etching films made of polyimide based polymers, including polyamide-imides, are provided, which include dissolving desired portions of the film in a solution of a basic compound in a non-aqueous solvent.

11 Claims, No Drawings

METHOD OF ETCHING FILMS MADE OF POLYIMIDE BASED POLYMERS

BACKGROUND OF THE INVENTION

This invention relates to etching of films made of polyimide based polymers, including polyamide-imides.

Polyimide film, such as that sold by E. I. duPont under the trade name "Kapton", is a very tough film which maintains its physical, chemical, and electrical properties over a wide temperature range. Such film has many properties which make it useful in many industrial applications. Its superior insulating properties even in very small thicknesses combined with its other properties make it desirable for use in flexible printed circuitry.

Etching of the film is desired in many such contexts of use, and etching of polyimide film has presented difficult problems to the art. The only successful methods presently known to applicant for etching such film, must be performed in highly basic aqueous solutions. But the use of such basic solutions is undesirable for several reasons.

For example, due to hydration of the $OH^-$ ions, a base strength in aqueous solution cannot be achieved with a pH above about 16.

Further, as the film is etched in the aqueous solution, the reaction products are held in a gummy suspension on the surface of the film, such gummy suspension preventing further etching agent from obtaining good surface contact with the film, and thus markedly slowing or even stopping the etching process.

Still another problem with such prior art methods is that the strongly basic solutions used in the art have included aqueous solutions of such bases as sodium hydroxide or hydrazine. Hydrazine, particularly, in the effective concentration, is hazardous to work with and especially dangerous to skin and eyes.

Accordingly, it would be desirable if a method for etching polyimide film would be provided which employs chemical reagents less hazardous than hydrazine and which provides adequate solubility for the by-products to facilitate etching.

This invention provides such method.

SUMMARY OF THE INVENTION

The invention provides methods for etching polyimide-based film in non-aqueous solutions. The solutions contemplated comprises ionizable basic compounds, such as tetraethylammonium hydroxide in a solution of a suitable non-aqueous solvent such as dimethylsulfoxide.

In accordance with the methods of the invention, a suitable polyimidebased film, such as a laminate of polyimide film to copper, is provided. The film is then coated with a suitable etch resist, and the photoresist is exposed and developed in accordance with the desired pattern.

The desired portions of the polyimide film are then etched with the non-aqueous solution of a suitable ionizable base in a suitable solvent as will be more fully explained below.

The etch reaction products are easily removed from the surface, and it is found that the etch lines are smooth and clean. The photoresist may then be removed in any desired manner.

DETAILED DESCRIPTION OF PREFERRED EMBODIMENTS

As previously noted, polyimide film is a light and tough film which provides superior insulation at high temperatures. Technical information on such film is available from the DuPont company which markets one such film under the trademark Kapton.

Metal laminates of polyimide film, especially copper laminates, find utility in flexible printed circuitry, and it is with such laminates that this invention is primarily concerned. For ease of explanation in this application, such laminates will be considered to have an upper (polyimide film) surface and a lower (metal) surface.

Thus, the preferred embodiments of this invention are directed toward etching of such polyimide-based film laminates to form printed circuits. But it should be remembered that the invention may also have utility in other applications in which it is desired to etch polyimide-based film.

In accordance with the preferred embodiment which applicant believes to represent the best mode of the invention at the time of this application, a suitable metal laminate of polyimide film is provided.

The upper surface of the laminate is coated with a suitable photomask, such as KMER (Kodal Metal Etch Resist). The photomask is exposed and developed in accordance with techniques well-known in the art, to provide a pattern in accordance with the desired end use of the product.

An etching solution is prepared from a suitable non-aqueous solvent and a suitable ionizable base compound.

Base compounds which have thus far been found satisfactory for use in connection with the invention are the quaternary ammonium hydroxides described by the following formula

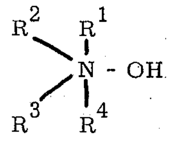

and mixtures thereof, where $R^1$ and $R^2$ are the same or different alkyl radicals of 1 through 4 carbons; $R^3$ is alkyl of 1 through 18 carbons or alkenyl of 1 through 18 carbons; and $R^4$ is alkyl of 1 through 18 carbons, alkenyl of 1 through 18 carbons, phenyl, alkylphenyl where the alkyl portion has 1 through 18 carbons, benzyl or alkylbenzyl where the alkyl portion has 1 through 18 carbons.

Representative quaternary ammonium hydroxides useful according to the present invention are the following: tetramethyl ammonium hydroxide, tetraethyl ammonium hydroxide, tetrabutyl ammonium hydroxide, benzyl trimethyl ammonium hydroxide, phenyl trimethyl ammonium hydroxide, dodecyl trimethyl ammonium hydroxide, hexadecyl trimethyl ammonium hydroxide, octadecyl trimethyl ammonium hydroxide, dodecyl triethyl ammonium hydroxide, hexadecyl triethyl ammonium hydroxide, octadecyl triethyl ammonium hydroxide, dodecyl tri-n-propyl ammonium hydroxide, dodecyl tri-isopropyl ammonium hydroxide, benzyl dimethyl hexadecyl ammonium hydroxide, dimethyl ethyl hexadecyl ammonium hydroxide, p-dodecylbenzyl trimethyl ammonium hydroxide, and benzyl dimethyl octadecyl ammonium hydroxide.

The non-aqueous solvents selected for use in accordance with the invention should be those having very high dipole moments but with no hydrogen bonding capabilities. Such solvents should have dielectric constants in the range from about 30–45.

These solvents should be able to ionize basic compounds such as tetraethylammonium hydroxide to give a basic activity in the range of about pH 26.

Specific solvents which have been found suitable by applicant for this purpose include dimethylsulfoxide as the solvent preferred at the time of this application, and similar non-aqueous solvents such as sulfolane, and dimethylformamide. Other such solvents which have been found satisfactory in such contexts of use include hexamethylphosphoramide; N-methyl pyrrolidone; N, N-dimethylacetamide; N, N-diethylformamide; N, N-diethylacetamide; and pyridine.

A specific solution for use in connection with the invention may be prepared as follows: 100 milliliters of 10 percent tetraethylammonium hydroxide is reduced to 20 ml. by boiling. Concentration of the base solution in this manner may not always be necessary, but it is desired in connection with this embodiment since the stronger base is more effective in achieving best results. 20 ml. of dimethylsulfoxide is then added to the concentrated tetraethylammonium hydroxide.

The solution is then heated to near its boiling point for etching the film. The heated solution (100°–150°C for the example given) is then applied to the masked upper surface of the laminate and in a short period of time (about two minutes in the example given when etching polyimide film of 5 mil. thickness), the film is satisfactorily etched.

In another specific example, 100 milliliters of 10 percent tetraethylammonium hydroxide was reduced to 20 ml. by boiling. The concentrated tetraethylammonium hydroxide solution was then added to 40 ml. of pyridine and 10 ml. of dimethylsulfoxide. The etch rate through a 5 mil Kapton film with both sides of the film exposed to the etching solution was found to be 0.15 mil/min. at 24°C and 1 mil/min. at 80°C.

In yet another example, 100 milliliters of 10 percent tetraethylammonium hydroxide was reduced to 20 ml. by boiling. The concentrated tetraethylammonium hydroxide was then added to 40 ml. of sulfolane. The etch rate through a 5 mil Kapton film with both sides of the film exposed to this etching solution was found to be 0.3 mil/min. at 85°C.

It is desirable and perhaps necessary to stir the solution during the etching process to remove dissolved film, but it is found that the etch profiles are clean and smooth, and the etch by-products are soluble or readily dispersed from the surface.

The etch mask should not be effected by the solution.

Laboratory studies have indicated that weaker solutions of tetraethylammonium hydroxide in dimethylsulfoxide may be ineffective to achieve the desired etching.

The etching solutions provided as discussed above are relatively safe, and require the same precaution as would normally be expected for strong chemical reagents. Ordinary steel or glass containers are suitable for storage of the chemical materials described herein which are essentially non-corrosive.

Although the invention has been described in terms of preferred embodiments, it will be apparent to those of skill in the art that various modifications might be made in the methods described without departing from the scope of the invention which is defined by the following claims.

What is claimed is:

1. A process for etching a film of a polyimide based polymer which comprises contacting said film with a solution of a strong organic base in a non-aqueous solvent selected from the group consisting of dimethylsulfoxide, sulfolane, dimethylformamide, hexamethylphosphoramide, N-methyl pyrrolidone, N, N-dimethylacetamide, N, N-diethylformamide; N, N-diethylacetamide, and pyridine.

2. The process in accordance with claim 1, wherein said strong organic base is a quaternary ammonium hydroxide.

3. The process in accordance with claim 2, wherein said hydroxide is tetraethylammonium hydroxide and said solvent is dimethylsulfoxide.

4. The process in accordance with claim 2, wherein said hydroxide is tetraethylammonium hydroxide and said solvent is pyridine.

5. The process in accordance with claim 3, wherein said hydroxide comprises at least about 30 percent of volume of said etching solution.

6. A process useful in making a printed circuit comprising: providing a laminate having a first layer of film of polyimide based polymer and a second metal layer; coating said first layer with a photomask; exposing and developing said photomask to form a desired pattern; providing an etching solution comprising a quaternary ammonium hydroxide in a nonaqueous solvent; contacting said first layer with said etching solution to etch the desired portions of said film; and removing the etch reaction product from said laminate.

7. The process in accordance with claim 6, wherein said solvent is selected from the group consisting of dimethylsulfoxide, sulfolane, dimethylformamide, hexamethylphosphoramide, N-methyl pyrrolidone, N, N-dimethylacetamide, N, N-diethylformamide, N, N-diethylacetamide, and pyridine.

8. The process in accordance with claim 7, wherein said hydroxide is tetraethylammonium hydroxide and said solvent is dimethylsulfoxide.

9. The process in accordance with claim 7, wherein said hydroxide is tetraethylammonium hydroxide and said solvent is pyridine.

10. The process in accordance with claim 8, wherein said hydroxide comprises at least about 30 percent by volume of said etching solution.

11. The process in accordance with claim 6, wherein said etching solution is stirred while it is in contact with said film.

* * * * *